Feb. 21, 1956  J. R. COX  2,735,686
CHUCKING DEVICE
Filed Oct. 19, 1953

INVENTOR.
JOHN R. COX
BY
Woodling and Krost,
Attorneys

United States Patent Office 2,735,686
Patented Feb. 21, 1956

2,735,686

CHUCKING DEVICE

John R. Cox, Cleveland, Ohio

Application October 19, 1953, Serial No. 386,807

10 Claims. (Cl. 279—50)

My invention relates to chucks for holding tools, workpieces and the like.

An object of my invention is to provide an improved construction in a chuck for efficient and facile operation of the chuck.

Another object is the provision of a chuck having a revolvable operating member which when turned in one direction releases a collet in the chuck and when turned in an opposite direction closes or compresses the collet in the chuck.

Another object is the provision for improved means for operating the chuck through the medium of balls or roller members movable in the chuck.

Another object is the provision of a chuck that is economical in construction and efficient in use.

Still another object is the provision of a chuck operating in an improved manner and with a minimum of working parts to provide the required results.

Other objects and a fuller understanding of the invention may be had by referring to the following description and claims, taken in conjunction with the accompanying drawing, in which:

Figure 1:
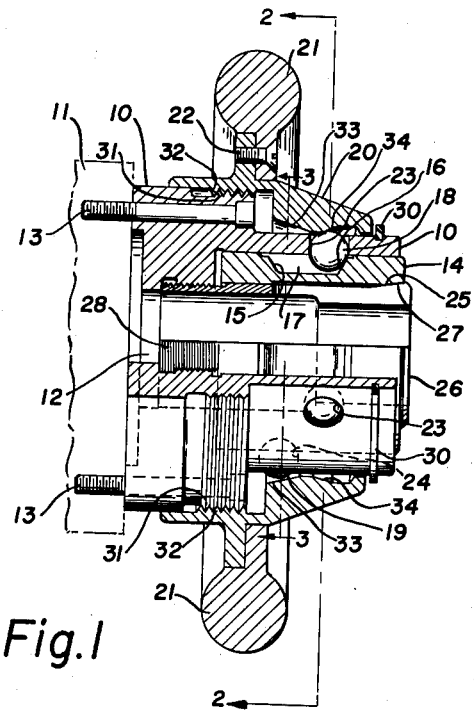
Figure 1 is a longitudinal, sectional view of a chuck embodying my invention and taken in the direction of the line 1—1 of Figure 2.
Figure 2:
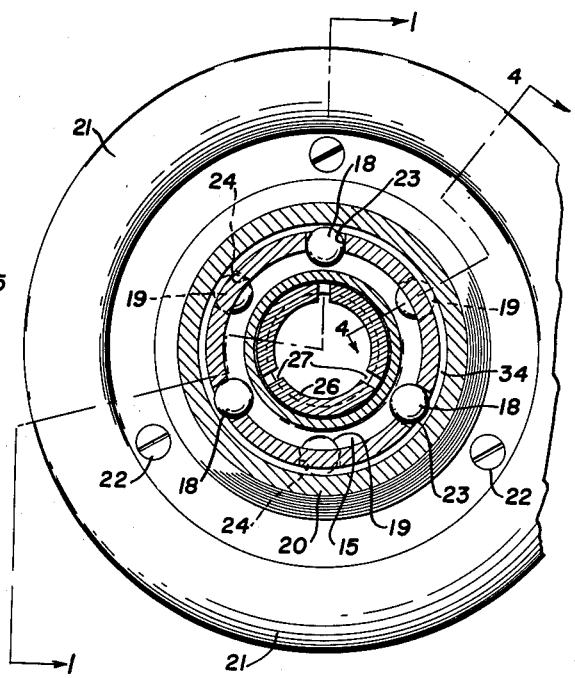
Figure 2 is a cross-sectional view of a chuck embodying my invention and taken through the line 2—2 of Figure 1.

My chuck embodies a base member 10, which is secured to a support or foundation 11 of a machine or other member to which the chuck is attached by means of threaded bolts 13. The base 10 is hollow in that it has an axially extending open space 12 extending therethrough, this space 12 being substantially centrally located in the base.

Positioned within the central bore of the base adjacent its forward end is an actuating head of reciprocal sleeve 14. A collet 26 has its rearward threaded end portion 28 threadably engaged to the base 10, as shown in the drawing, so that the collet 26 extends centrally of the base 10 and within the sleeve 14.

The forward end of the collet 26 is formed into three resilient fingers by slots 29. There is a conical outer surface portion 27 at the end of the collet and this surface portion 27 cooperates with a conical inner surface 25 of the sleeve 14. Thus, upon reciprocation of the sleeve 14, the resilient fingers of the collet are compressed or released by the coaction of the conical surfaces 25 and 27.

There is an annular groove 17 disposed in the outer cylindrical wall of the sleeve 14 and extending therearound. This groove 17 has a rear inclined end wall or camming surface 15 and spaced therefrom a forward inclined end wall or camming surface 16. The base member 10 has a forward set of openings 23 in which are disposed balls 18. This forward set of balls 18 move radially inward and outward of the chuck in the openings 23.

Axially spaced from the forward openings 23 and offset therefrom, that is, out of phase with the positions of the forward openings 23, are three rearward openings 24 in which are accommodated respective rearward balls 19. These rearward balls 19 also are adapted to move radially inward and outward relative to the base member 10. The balls 18 and 19 are in a staggered position so that the three balls 18 are in one plane and the three balls 19 are in another plane, the planes being spaced from each other axially of the chuck. The position of the balls is such that the forward balls 18 upon moving radially inwardly engage and press upon the inclined camming surface 16, whereas the balls 19, upon moving radially inwardly, engage and press upon the inclined camming surface 15 of the groove 17. Therefore, the movement of the sleeve 14 in one direction or the other depends upon the inward movement of one set of balls, the alternate inward movement of the sets of balls providing for reciprocation of the sleeve 14.

Mounted upon and surrounding the base 10 is an operating member or outer shell 20. This operating member 20 has a handwheel 21 secured thereto by means of the screws 22. There are internal threads 32 which are threadably engaged to the external threads 31 on the outer wall of the base member 10. Revolving the handwheel 21 and hence the operating member 20 causes the operating member 20 to turn upon the inter-engaged threads 31 and 32 and thus causes the operating member to move axially forwardly and rearwardly, repending upon the direction of rotation. A clip or retaining ring 30 resiliently mounted on the forward end of the base member 10 prevents the operating member from becoming accidently moved too far forward so as to become disengaged therefrom.

Figure 4:
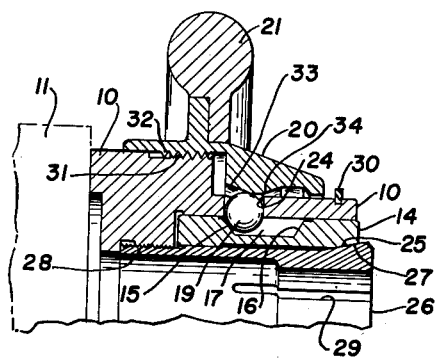
Figure 4 is a partial cross-sectional view of a chuck embodying my invention taken through the line 4—4 of Figure 2.
Figure 3:
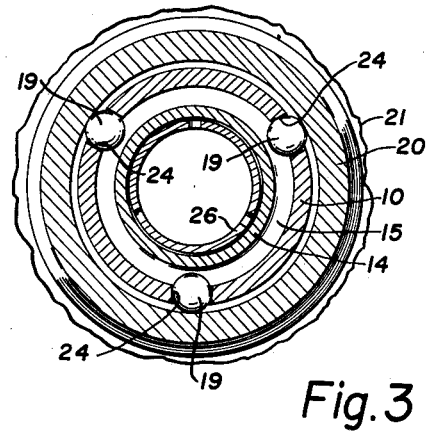
Figure 3 is a cross-sectional view taken through the line 3—3 of Figure 1.

As shown in the drawing the internal wall of the operating member 20 adjacent its forward end is spaced somewhat from the outer wall of the base 10. This inner wall in the vicinity of the balls 18 and 19 has two major portions. One major portion of the inner wall of the operating member is comprised of the rearwardly inclined inner wall or camming surface 33 and the other major portion of the inner wall of the operating member is comprised of the forwardly inclined inner wall or camming surface 34. These surfaces 33 and 34 are inclined at an angle to each other, as seen in Figures 1 and 4 of the drawing.

The surface 34 is facing an opposite direction from the surface 16 of the sleeve 14 so that upon forward axial movement of the operating member 20, the inclined camming surface 34 presses the balls 18 radially inward and hence against the inclined camming surface 16 of the sleeve 14. This inward movement of the balls 18 causes the sleeve 14 to move forwardly and to thus close the collet. At the same time that the sleeve 14 is moving forwardly, the inclined camming surface 15 of the sleeve 14 moves the rearward set of balls 19 radially outward through the respective openings and toward the operating member 20. The inclination of the inclined camming surface 33 is such as to permit the balls 19 to radially move outward through their respective openings to the position shown in Figure 4. In Figure 1, the sleeve 14 has been moved forwardly by the balls 18, whereas in Figure 4, the sleeve 14 has been moved rearwardly by the balls 19. As the balls 19 are moved inwardly by the inclined camming surface 33 when the operating member 20 is turned so as to move rearwardly, the balls 19 move radially inward to press upon the inclined camming surface 15. When in this rearward position of Figure 4, the forward balls 18 move radially outward by reason of the relief given by the inner walls of the operating member to permit this outward radial movement.

It is thus seen that reciprocation of the sleeve 14 is readily obtained by revolving the handwheel 21 and this in turn alternately closes or compresses the collet 26 and releases or opens the collet 26. To close the collet, the handwheel 21 is revolved in a direction so as to cause the operating member 20 to press the balls 18 inwardly against the inclined camming surface 16 of the sleeve 14. To open the collet, the handwheel 21 is revolved in an opposite direction so as to cause the balls 19 to move radially inward against the inclined camming surface 15 of the sleeve 14. In each case, the other set of balls is permitted to move radially outward away from the sleeve 14.

The construction and arrangement shown provides for a quick acting and convenient operation in a chuck which securely holds the collet in a locked position while permitting the quick and easy release of the collet with a minimum of effort and movement.

The present disclosure includes the description contained in the appended claims as well as that contained in the foregoing description and in the drawings.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A chuck comprising in combination a base, said base having an open space for accommodating a collet and adapted to mount a collet in said open space, an actuating head in said open space and adapted to surround and actuate said collet by reciprocal movement of the actuating head in a direction axially of the collet, said actuating head having opposed camming surfaces inclined toward each other and arranged on the outer wall of the actuating head, a pair of sets of balls carried by said base around said actuating head and movable radially toward and away from said actuating head, the sets of balls being spaced apart in an axial direction and arranged for the balls of one set to engage one of said opposed camming surfaces and the balls of the other set to engage the other of said opposed camming surfaces, and an operating member carried by said base for alternately moving one of said sets of balls radially inward and permitting the other of said sets of balls to move radially outward, the alternate movement of said sets of balls against the opposed camming surfaces of the actuating head causing reciprocal movement of the actuating head for actuating said collet.

2. A chuck comprising in combination a base having a central open space therein, said base being adapted to hold a collet in said open space, an actuating head carried by said base and adapted to surround said collet and to actuate the collet upon reciprocal movement of the actuating head relative to the collet, said actuating sleeve having an annular groove in the outer wall thereof, said groove having opposed walls inclined toward each other and radially inward, a first set of balls carried by the base and disposed in a first plane extending transversely of the base, a second set of balls carried by the base and disposed in a second plane extending transversely of the base and at an axial distance from the first plane, said base having openings accommodating said balls to permit their radial movement toward and away from said actuating head, and an operating member surrounding and carried by said head for governing the radial movement of said balls, said operating member including first means for moving one of said sets of balls radially inward against one of said opposed walls of the actuating head to move the actuating head in one direction and second means for alternately moving the other set of balls radially inward against the other of said opposed walls of the actuating head to move the actuating head in the opposite direction.

3. A chuck comprising in combination a base having an axially disposed open space, said base being adapted to carry a collet axially extended in said open space, an actuating head carried by the base to embrace said collet, said actuating head having surfaces arranged to cooperate with surfaces of said collet to operate the collet upon reciprocal movement of the actuating head axially of the collet, said actuating head including first camming means and second camming means spaced apart axially of the chuck, first roller means and second roller means carried by said head and spaced apart axially of the chuck, said first roller means being movable inward against said first camming means to move the actuating head in one direction, said second roller means being movable inward against said second camming means to move the actuating head in an opposite direction, and an operating member carried by said head and movable axially of the chuck, said operating member including third camming means and fourth camming means spaced apart axially of the chuck, said third camming means being arranged to engage and move inwardly one of said roller means and said fourth camming means being arranged to engage and move inwardly the other of said roller means, movement of said operating member in opposite directions providing for opening and closing said collet.

4. A chuck comprising a base having an open space axially disposed therein, a collet carried by said base and axially extending in said open space, said collet and said base having cooperating tapered portions adapted to operate said collet upon axial movement of one relative to the other, first camming means and second camming means disposed around said collet, said camming means being arranged to move one of said tapered portions relative to the other in axial direction, first roller means and second roller means movable radially of the chuck, said first roller means upon radially inward movement engaging said first camming means to move the first camming means in one axial direction and said second roller means upon radially inward movement engaging said second camming means to move the second camming means in an opposite axial direction to provide for relative axial movement between said cooperating tapered portions of the collet and base, and an operating member movable axially of the chuck, said operating member including spaced third camming means and fourth camming means and adapted to alternately move said first and second roller means radially inward of the chuck, the alternate radially inward movement of said first and second roller means providing for the operating of said collet.

5. A chuck comprising a base, said base having an axially disposed open space and adapted to carry a collet extending axially in said open space, said collet having a tapered portion adapted to be engaged for closing the collet, engaging means carried by said base for engaging said tapered portion of the collet, first camming means positioned in said open space for providing relative movement between said engaging means and said tapered portion in one axial direction, second camming means positioned in said open space for providing relative movement between said engaging means and said tapered portion in an opposite axial direction, a first movable element carried by the base and arranged to engage and operate the first camming means upon radially inward movement of said first movable element, a second movable element carried by the base and arranged to engage and operate the second camming means upon radially inward movement of said second movable element, and operating means for moving said movable elements, said operating means including third camming means arranged to move one of said movable elements radially inward of the chuck and fourth camming means arranged to move the other of said movable elements radially inward of the chuck, alternate movement of said movable elements by said operating means providing for relative movement between said engaging means and tapered portion by alternate operation of said first and second camming means.

6. A chuck comprising a cylindrical shell having an axially disposed open space therein, a collet carried by said shell and axially disposed in said open space, a sleeve positioned in said open space around said collet, said collet and sleeve having cooperating surfaces arranged to close and open said collet upon reciprocal movement of the sleeve relative to the collet, said sleeve having in its outer cylindrical wall an annular groove, said groove having spaced end walls inclined toward each other, two sets of balls carried by the base and mounted to move radially of the base relative to said sleeve, one of said sets of balls being arranged in one plane disposed transversely of the chuck and the other of said sets of balls being arranged in a second plane disposed transversely of the chuck and spaced from said first plane, and an operating member mounted around said shell and threadably engaged therewith to move axially forward and rearward of the shell upon the turning of the operating member on the shell, said operating member having an inner wall disposed radially outward of said balls, said inner wall having surfaces inclined toward each other, one of said sets of balls being engageable by one of said surfaces to move the balls of said one set inwardly against one of said spaced end walls and the other of said sets of balls being engageable by the other of said surfaces to move the balls of said other set inwardly against the other of said spaced end walls, movement of said operating member axially of the shell forwardly and rearwardly alternately causing said sets of balls to move and said sleeve to reciprocate for closing and opening said collet.

7. A chuck comprising a base, said base having an open space therein, mounting means for mounting a collet to said base within said open space, an actuating member positioned in said open space for opening and closing the collet upon reciprocal movement of the actuating member in an axial direction, said actuating member having a first camming surface and a second camming surface arranged in opposition to each other, an operating member mounted on said base to move forwardly and rearwardly thereon, said operating member having a third camming surface and a fourth camming surface arranged in opposition to each other, first ball means and second ball means carried by said base and movable radially thereof, said first ball means being engageable and movable radially inward by one of said third and fourth camming surfaces of the operating member to engage one of said first and second camming surfaces of the actuating member and to move the actuating member in one direction, said second ball means being engageable and movable radially inward by the other of said third and fourth camming surfaces of the operating member to engage the other of said first and second camming surfaces of the actuating member and to move the actuating member in an opposite direction.

8. A chuck comprising in combination a base, said base having an open space for accommodating a collet and adapted to mount a collet in said open space, an actuating head in said open space and adapted to surround and actuate said collet by reciprocal movement of the actuating head in a direction axially of the collet, said actuating head having opposed camming surfaces inclined toward each other and arranged on the outer wall of the actuating head, a pair of sets of balls carried by said base around said actuating head and movable radially toward and away from said actuating head, the sets of balls being arranged for the balls of one set to engage one of said opposed camming surfaces and the balls of the other set to engage the other of said opposed camming surfaces, and an operating member carried by said base for alternately moving one of said sets of balls in one direction and permitting the other of said sets of balls to move in an opposite direction, the alternate movement of said sets of balls against the opposed camming surfaces of the actuating head causing reciprocal movement of the actuating head for actuating said collet.

9. A chuck comprising in combination a base having an axially disposed open space, said base being adapted to carry a collet axially extended in said open space, an actuating head carried by the base to embrace said collet, said actuating head having surfaces arranged to cooperate with surfaces of said collet to operate the collet upon reciprocal movement of the actuating head axially of the collet, said actuating head including first camming means and second camming means, first roller means and second roller means carried by said head, said first roller means being movable against said first camming means to move the actuating head in one direction, said second roller means being movable against said second camming means to move the actuating head in an opposite direction, and an operating member carried by said head and movable axially of the chuck, said operating member including third camming means and fourth camming means, said third camming means being arranged to engage and move one of said roller means and said fourth camming means being arranged to engage and move the other of said roller means, movement of said operating member in opposite directions providing for opening and closing said collet.

10. A chuck comprising a base having an open space axially disposed therein, a collet carried by said base and axially extending in said open space, said collet and said base having cooperating tapered portions adapted to operate said collet upon axial movement of one relative to the other, first camming means and second camming means disposed adjacent said collet, said camming means being arranged to move one of said tapered portions relative to the other in an axial direction, first roller means and second roller means movable relative to the first and second camming means, said first roller means upon movement engaging said first camming means to move the first camming means in one axial direction and said second roller means upon movement engaging said second camming means to move the second camming means in an opposite axial direction to provide for relative axial movement between said cooperating tapered portions of the collet and base, and an operating member movable axially of the chuck, said operating member including third camming means and fourth camming means and adapted to alternately move said first and second roller means, the alternate movement of said first and second roller means providing for the operating of said collet.

References Cited in the file of this patent

UNITED STATES PATENTS

| | | |
|---|---|---|
| 2,400,183 | Wilson | May 14, 1946 |
| 2,454,098 | Schmidt | Nov. 16, 1948 |
| 2,466,651 | Zagar | Apr. 5, 1949 |
| 2,467,569 | Walters | Apr. 19, 1949 |